United States Patent [19]
Skruhak et al.

[11] Patent Number: 5,301,345
[45] Date of Patent: Apr. 5, 1994

[54] DATA PROCESSING SYSTEM FOR PERFORMING A SHIFTING OPERATION AND A CONSTANT GENERATION OPERATION AND METHOD THEREFOR

[75] Inventors: Robert J. Skruhak; Michael E. Gladden, both of Austin, Tex.

[73] Assignee: Motorola, Inc., Schaumburg, Ill.

[21] Appl. No.: 695,161

[22] Filed: May 3, 1991

[51] Int. Cl.[5] .......................... G06F 5/01; G06F 7/64; G06F 9/30; G06F 9/315
[52] U.S. Cl. ................................ 395/800; 364/238.7; 364/238.6; 364/239.7; 364/239.8; 364/240; 364/240.1; 364/240.5; 364/242; 364/241.2; 364/247; 364/258; 364/259.5; 364/259.9; 364/262.8; 364/268.4; 364/265.1; 364/265.4; 364/DIG. 1; 364/DIG. 2
[58] Field of Search .............. 395/375, 400, 425, 200, 395/250, 275, 325, 550, 575, 725, 800, 500; 364/DIG. 1, DIG. 2

[56] References Cited

U.S. PATENT DOCUMENTS

| | | | |
|---|---|---|---|
| 4,414,622 | 11/1983 | Matsumoto | 395/400 |
| 4,414,625 | 11/1983 | Miller | 395/375 |
| 4,415,969 | 11/1983 | Bayliss et al. | 395/375 |
| 4,467,444 | 8/1984 | Harmon, Jr. et al. | 395/375 |
| 4,785,393 | 11/1988 | Chu et al. | 395/375 |
| 4,821,187 | 4/1989 | Ueda et al. | 395/375 |
| 4,875,160 | 10/1989 | Brow, III | 395/375 |
| 4,903,231 | 2/1990 | Artieri | 395/425 |
| 5,023,828 | 6/1991 | Grundmann et al. | 395/375 |
| 5,163,120 | 11/1992 | Childers et al. | 395/800 |

Primary Examiner—Alyssa H. Bowler
Assistant Examiner—Daniel H. Pan
Attorney, Agent, or Firm—Elizabeth A. Apperley

[57] ABSTRACT

A data processing system (10) has a control selector (30) which has at least one conductor used for the common functions of shifting data and controling the generation of constants in an execution unit (26). A logic circuit (34) provides control signals to enable the control selector (30) to perform an information transfer, a shift operation, or a constant generation function. A plurality of constant signals enables a plurality of transistors (82, 114, 130, 84, 132, 86, 134) to generate a plurality of constant values. During an operation to shift data, a portion of the logic circuit (30) which generates a constant value is disabled by a Shift Disable signal. The conductors used to enable the control electrodes of the transistors during a constant generation function are used to shift data a predetermined number of bits when two shift signals are asserted.

11 Claims, 3 Drawing Sheets

DATA PROCESSING SYSTEM FOR PERFORMING A SHIFTING OPERATION AND A CONSTANT GENERATION OPERATION AND METHOD THEREFOR

FIELD OF THE INVENTION

This invention relates generally to data processing systems, and more particularly, to data processors which shift data and generate constants.

BACKGROUND OF THE INVENTION

To execute software data processing instructions, a data processing system typically enables an arithmetic logic unit (ALU). The arithmetic logic unit is generally comprised of a ROM for storing control information, a logic unit to decode the control information, and an execution unit to perform arithmetic operations on a predetermined information value. The execution unit typically performs add and multiply functions on the information value. The execution unit may also shift or otherwise manipulate the information value in a manner determined by a system designer of the data processing system. For example, if the system designer of the data processing system determines that a constant value should be added to each address value for a predetermined operation, a function to generate the constant value is implemented in the execution unit.

In the data processing system, the execution unit generally requires a large amount of circuit area. For each arithmetic or constant generation operation, a predetermined data path must be defined and dedicated solely for the execution of the operation. As an example, for the execution unit to perform an arithmetic right shift by four operation, at least four data paths must be dedicated for that use. Similarly, to accomplish an arithmetic left shift by eight, at least eight data paths must be defined. A plurality of dedicated data paths must also be implemented for the generation of constant values by the execution unit.

The arithmetic operations performed by the execution unit must generally be accomplished as quickly as possible. Therefore, in a semiconductor data processing device, each of the data paths defined in the execution unit must be implemented in metal, the best conductor. However, the area required to implement all of the dedicated data paths in metal often comprises a major portion of the data processing system circuitry area. Therefore, other portions of logic circuitry outside the execution unit which also increase the performance of the system are often removed as a compromise to compensate for the circuit area required by the execution unit.

In data processing systems in which the circuit area is limited, the system designer must provide a design which provides maximum performance of the data processing system and quick operation of the execution unit. The compromise between performance of the data processing system and the quick operation of the execution unit often results in a less efficient and less powerful data processing system.

SUMMARY OF THE INVENTION

The previously mentioned needs are fulfilled with the present invention. Accordingly, there is provided, in one form, a data processing system which has a storage circuit for receiving and storing a first data value, a decoder for decoding the first data value to provide a plurality of control values, and a control selection circuit for performing one of a shifting operation and a constant generation operation. The control selection circuit includes a first input for receiving the plurality of control signals, a second input for receiving a second data value, and a plurality of bit stages. Each of the plurality of bit stages is connected to the first input for receiving at least one of the plurality of control signals and is connected to the second input for receiving a bit of the second data value. The control selection circuit also includes a common conductor for interconnecting the plurality of bit stages. The common conductor is used to transfer a bit of the second data value from a first one of the plurality of bit stages to a second one of the plurality of bit stages in response to a first one of the plurality of control signals. The common conductor is also used as a control signal for generating a constant data value in response to a second one of the plurality of control signals.

In a second preferred embodiment of the present invention, there is provided a method for performing one of a shifting operation and a constant generation operation in a data processing system. The method includes the steps of receiving and storing a first data value, decoding the first data value to provide a plurality of control signals, and providing the plurality of control signals to each of a plurality of bit stages. A second data value is also provided to the plurality of bit stages and each of the plurality of bit stages receives a corresponding bit of the second data value. A first one of the plurality of bit stages is enabled to transfer a bit of the second data value to a second one of the plurality of bit stages via a common conductor when a first one of the plurality of control signals is asserted. A portion of the plurality of bit stages is enabled to generate a constant data value when a second one of the plurality of control signals is asserted and the common conductor is used to provide the second one of the plurality of control signals.

These and other features, and advantages, will be more clearly understood from the following detailed description taken in conjunction with the accompanying drawings.

DETAILED DESCRIPTION OF A PREFERRED EMBODIMENT

Figure 1:
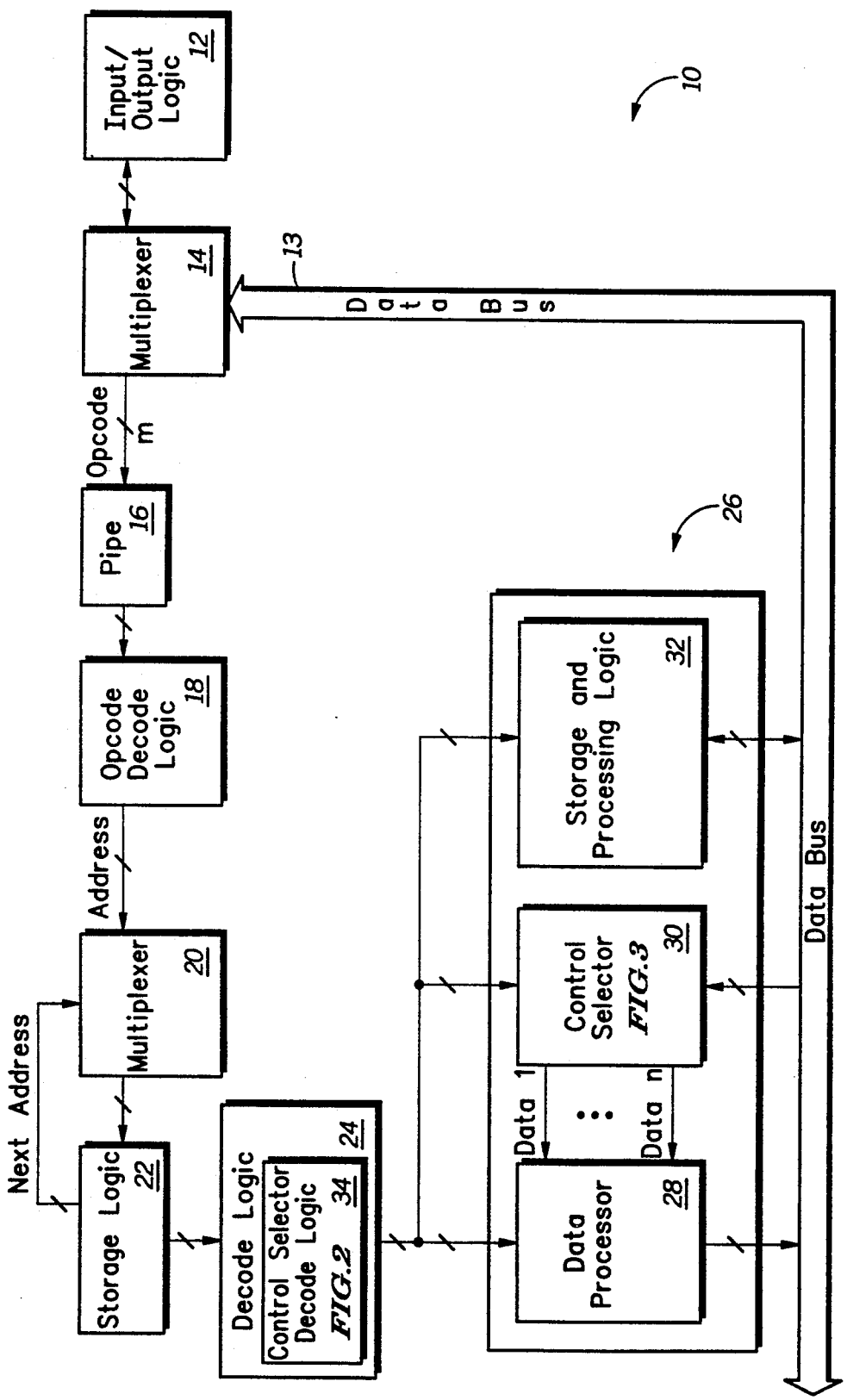
FIG. 1 illustrates in block diagram form a data processing system in accordance with the present invention.

Illustrated in FIG. 1 is a data processing system 10 in accordance with the present invention. The data processing system 10 is generally comprised of an Input/Output Logic circuit 12, a first Multiplexer 14, a Pipe 16, an Opcode Decode Logic circuit 18, a second Multiplexer 20, a Storage Logic circuit 22, a Decode Logic circuit 24, and an Execution Unit 26. The Execution Unit 26 is further comprised of a Data Processor 28, a Control Selector 30, and a Storage and Processing Logic circuit 32.

A software data processing instruction is determined by the user of the data processing system 10 and provided as an input signal to a first input/output terminal (not shown) of the Input/Output Logic circuit 12. The Input/Output Logic circuit 12 functions as an interface between the data processing system 10 and the user of the system. The Input/Output Logic circuit 12 receives information from and provides a plurality of output signals to the user of the data processing system 10.

The Input/Output Logic circuit 12 provides information to a multi-bit input of the first Multiplexer 14 via a second input/output terminal. When the data processing system 10 is configured to receive information, the first Multiplexer 14 receives an encoded operation code, opcode, of a software data processing instruction. The Multiplexer 14 subsequently outputs a first signal labelled "Opcode" which transfers the opcode to an input of the Pipe 16. The Opcode signal is m bits wide, where m is an integer.

If the data processing system 10 is configured to output information, a second input of the first Multiplexer 14 is configured to receive a multi-bit information signal from a Data Bus 13. The first Multiplexer 14 provides the output information signal to the second input/output terminal of the Input/Output Logic circuit 12. The output information is then transferred to the user of the data processing system 10 by the Input/Output Logic circuit 12.

The operation of the first Multiplexer 14 is controlled by a first encoded control program stored in a memory portion (not shown) of the data processing system 10. The encoded control program determines whether the Multiplexer 14 provides opcode information to the Pipe 16 or provides information to the Input/Output Logic circuit 12 to be output to the user of the system.

The Opcode signal provides an input to the Pipe 16. The Pipe 16 functions as a storage register to latch the value of the Opcode signal. At a predetermined point in the operation of the data processing system 10, the Pipe 16 outputs a latched Opcode signal to the Opcode Decode Logic circuit 18. The latched Opcode signal has a predetermined bit width, which is not necessarily equal to the bit width of the Opcode signal.

The Opcode Decode Logic circuit 18 decodes the latched Opcode signal to provide a signal of predetermined bit width labelled "Address". The Address signal is a decoded form of the software data processing instruction and indicates a starting address of a machine operation code program. The machine operation code program specifies the steps necessary to execute the software instruction. The machine operation code program is implemented for each software instruction executed in the data processing system 10 and is programmed internally within the data processing system 10 to implement the software instruction determined by the user of the system.

The Address signal provides a first input to the second Multiplexer 20. When the Multiplexer 20 provides information from the Opcode Decode Logic circuit 18, the Address signal is transferred to the input of the Storage Logic circuit 22.

The Storage Logic circuit 22 is a logic circuit which stores each of the machine operation code programs in a predetermined storage location. When the Address signal indicates the starting address of a predetermined machine operation code program, a plurality of information signals necessary to initiate the execution of a first step of the program is provided as input signals to the Decode Logic circuit 24. After the first step of the program is executed by the Execution Unit 26, the Storage Logic circuit 22 provides an output signal of predetermined bit width labelled "Next Address" as a second input to the Multiplexer 20. Multiplexer 20 selects the Next Address signal which provides the next address needed to execute the machine operation code program within the Storage Logic circuit 22. The Storage Logic circuit 22 provides the Next Address signal until the machine operation code program is fully executed in the Execution Unit 26. At that point, a new software data processing instruction is provided by the user of the data processing system 10 and a new Address signal is provided to the Multiplexer 20. The Storage Logic circuit 22 is typically implemented as a Programmable Logic Array (PLA) or a Read-Only Memory (ROM). However, the Storage Logic circuit 22 can be implemented by any form of logic circuitry.

The operation of the second Multiplexer 20 is controlled by a second encoded control program stored in a memory portion (not shown) of the data processing system 10. The encoded control program determines whether the Multiplexer 20 provides the Address signal or the Next Address signal to the Storage Logic circuit 22.

Figure 2:
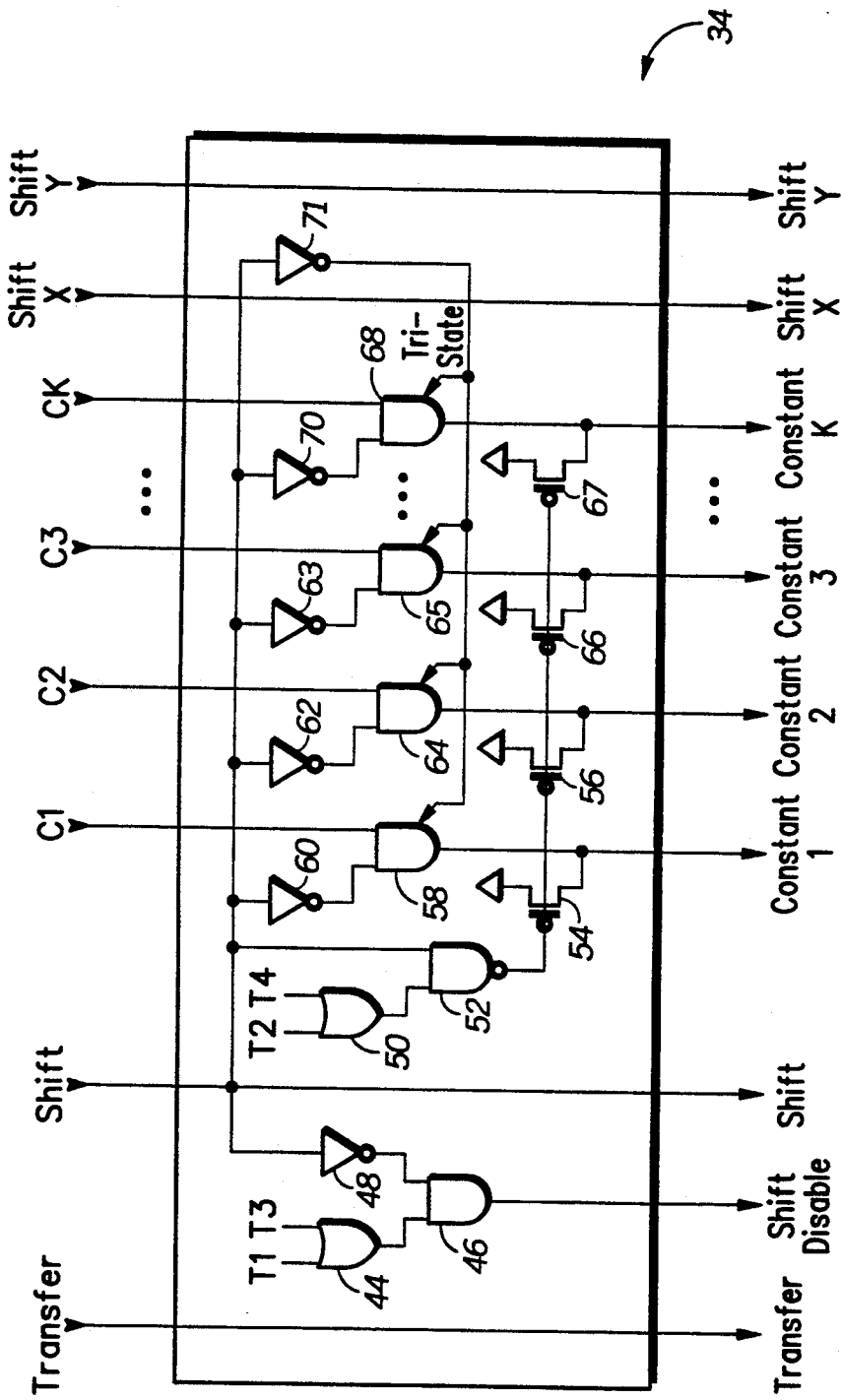
FIG. 2 illustrates in partial logic diagram form a Control Selector Decode Logic circuit as shown in FIG. 1.

The plurality of information signals corresponding to the first step of program execution is provided by the Storage Logic circuit 22 to the Decode Logic circuit 24. The Decode Logic circuit 24 manipulates the information signals to form a plurality of control signals which enable the Execution Unit 26 to implement the first step of the machine operation code program. The plurality of control signals further determines which portions of the Execution Unit 26 should be enabled during execution of the software instruction. For example, a plurality of control signals to enable the Control Selector 30 to either shift data from Data Bus 13, to generate a constant value or to transfer information from Data Bus 13 to Data Processor 28 without modification is provided by a Control Selector Decode Logic circuit 34 which is illustrated in FIG. 2.

The Control Selector Decode Logic circuit 34 receives the plurality of information signals from the Storage Logic circuit 22. The plurality of information signals contain control information for executing either a shift, a constant generation, or a data transfer operation within the Execution Unit 26 in response to a predetermined software data processing instruction. If the predetermined software data processing instruction specifies that a shift operation should occur, the Control Selector Decode Logic circuit 34 asserts a first portion of the plurality of control signals. In this example, the first portion of control signals is comprised of three signals respectively labelled "Shift," "Shift X," and "Shift Y." The Shift signal enables the Control Selector 30 to transfer data to be shifted. The Shift X signal enables the Control Selector 30 to shift data to the right by n bits, where n is an integer. The Shift Y signal enables the Control Selector 30 to shift data to the left by n bits. A second portion of the control signals is comprised of a single signal labelled "Transfer." The Transfer signal enables the Control Selector 30 to transfer a bit of information provided by the Data Bus 13 to one of a plurality of inputs of the Data Processor 28. Each one of the first and second portions of the plurality of control signals is coupled from the Storage Logic circuit 22 to the Execution Unit 26 via the Decode Logic circuit 24 with no form of modification.

A third portion of the control signals enables the Control Selector 30 to generate a plurality of constant values. The third portion of the control signals is comprised of a signal labelled "Shift Disable" and K constant enable signals, where K is an integer. The Shift Disable signal disables the circuitry to generate the constant values if a shift operation is currently being executed. The K constant enable signals indicate which one of a plurality of constant values should be generated. The constant enable signals are labelled "C 1," "C 2," "C 3," and "C K," respectively.

The third portion of the control signals is provided by the Control Selector Decode Logic circuit 34. The Control Selector Decode Logic circuit 34 is comprised of an OR gate 44, an AND gate 46, an inverter 48, an OR gate 50, a NAND gate 52, a transistor 54, a transistor 56, an AND gate 58, an inverter 60, an inverter 62, an AND gate 64, a transistor 66, a transistor 67, an AND gate 65, an inverter 63, an inverter 70, and an AND gate 68.

In the illustrated form, four signals are derived from a clock signal (not shown). Each clock signal represents a respective phase of the operation of the Control Selector Decode Logic circuit 34. The four signals are respectively labelled "T1," "T2," "T3," and "T4." The T1 signal represents the first phase of the clock signal, and the T2 signal represents the second phase of the clock signal. Likewise, the T3 and T4 signals respectively correspond to the third and fourth phases of the clock signal. The T1 and T3 signals control when information is accessed from the Data Bus 13 and stored in memory locations within the data processing system 10, such as the Storage Logic circuit 22, the Decode Logic circuit 24, and the Storage and Processing Logic circuit 32. The T2 and T4 signals control when information is manipulated in logic circuitry of the Control Selector Decode Logic circuit 34 and when nodes are precharged to a predetermined reference voltage for subsequent operations.

The T1 and T3 signals are respectively connected to a first and a second input of OR gate 44. An output of OR gate 44 provides a first input to AND gate 46. The Shift signal provides an input to inverter 48. An output of inverter 48 is connected to a second input of AND gate 46. An output of AND gate 46 provides the Shift Disable signal to the Control Selector 30.

The T2 and T4 signals are respectively connected to a first and a second input of the second OR gate 50. An output of the second OR gate 50 provides a first input to the NAND gate 52. The Shift signal is connected to a second input to the NAND gate 52. An output of the NAND gate 52 is connected to control electrodes of each of transistor 54, transistor 56, transistor 66, and transistor 67. The control electrodes may also be referred to as gates.

The Shift signal is also connected to an input of inverter 60. An output of inverter 60 is connected to a first input of AND gate 58. A second input of AND gate 58 is connected to the C 1 constant enable signal. A signal labelled "Tri-State" provides a control input to AND gate 58. If the Tri-State signal has a logic low value, the AND gate 58 is disabled and does not provide an output signal. However, if the Tri-State signal has a logic high value, the AND gate 58 is enabled to provide a predetermined one of a plurality of constant information signals labelled "Constant 1." The Constant 1 signal is connected to a first current electrode of the first transistor 54. If asserted, the Constant 1 constant information signal indicates that a first constant value should be generated by the Control Selector 30. A second current electrode of transistor 54 is connected to an electrical power supply voltage.

The Shift signal is connected to an input of inverter 62. An output of inverter 62 provides a first input to AND gate 64. A second input to AND gate 64 is connected to the C 2 constant enable signal. The Tri-State signal provides a control input to AND gate 64. If the Tri-State signal has a logic low value, AND gate 64 is disabled and does not provide an output signal. However, if the Tri-State signal has a logic high value, AND gate 64 is enabled to provide a predetermined constant information signal labelled "Constant 2." The Constant 2 signal is connected to a first current electrode of transistor 56. If asserted, the Constant 2 signal indicates that a second constant value should be generated by Control Selector 30. A second current electrode of transistor 56 is also connected to the electrical power supply voltage.

The Shift signal is connected to an input of inverter 63. An output of the inverter 63 provides a first input to AND gate 65. A second input to AND gate 65 is connected to the C 3 constant enable signal. The Tri-State signal provides a control input to AND gate 65. If the Tri-State signal has a logic low value, AND gate 65 is disabled and does not provide an output signal. However, if the Tri-State signal has a logic high value, AND gate 65 is enabled to provide a predetermined constant information signal labelled "Constant 3." The Constant 3 signal is connected to a first current electrode of the third transistor 66. If asserted, the Constant 3 signal indicates that a third constant value should be generated by Control Selector 30. A second current electrode of transistor 66 is also connected to the electrical power supply voltage.

The Shift signal is connected to an input of inverter 70. An output of the inverter 70 is connected to a first input of AND gate 68. A second input to AND gate 68 is provided by the CK signal. The Tri-State signal provides a control input to AND gate 68. If the Tri-State signal has a logic low value, AND gate 68 is disabled and does not provide an output signal. However, if the Tri-State signal has a logic high value, AND gate 68 is enabled to provide a predetermined constant information signal labelled "Constant K." The Constant K signal is connected to a first current electrode of transistor 67. If asserted, the Constant K signal indicates that the last constant value should be generated by the Control Selector 30. A second current electrode of transistor 67 is also connected to the electrical power supply voltage.

Figure 3:
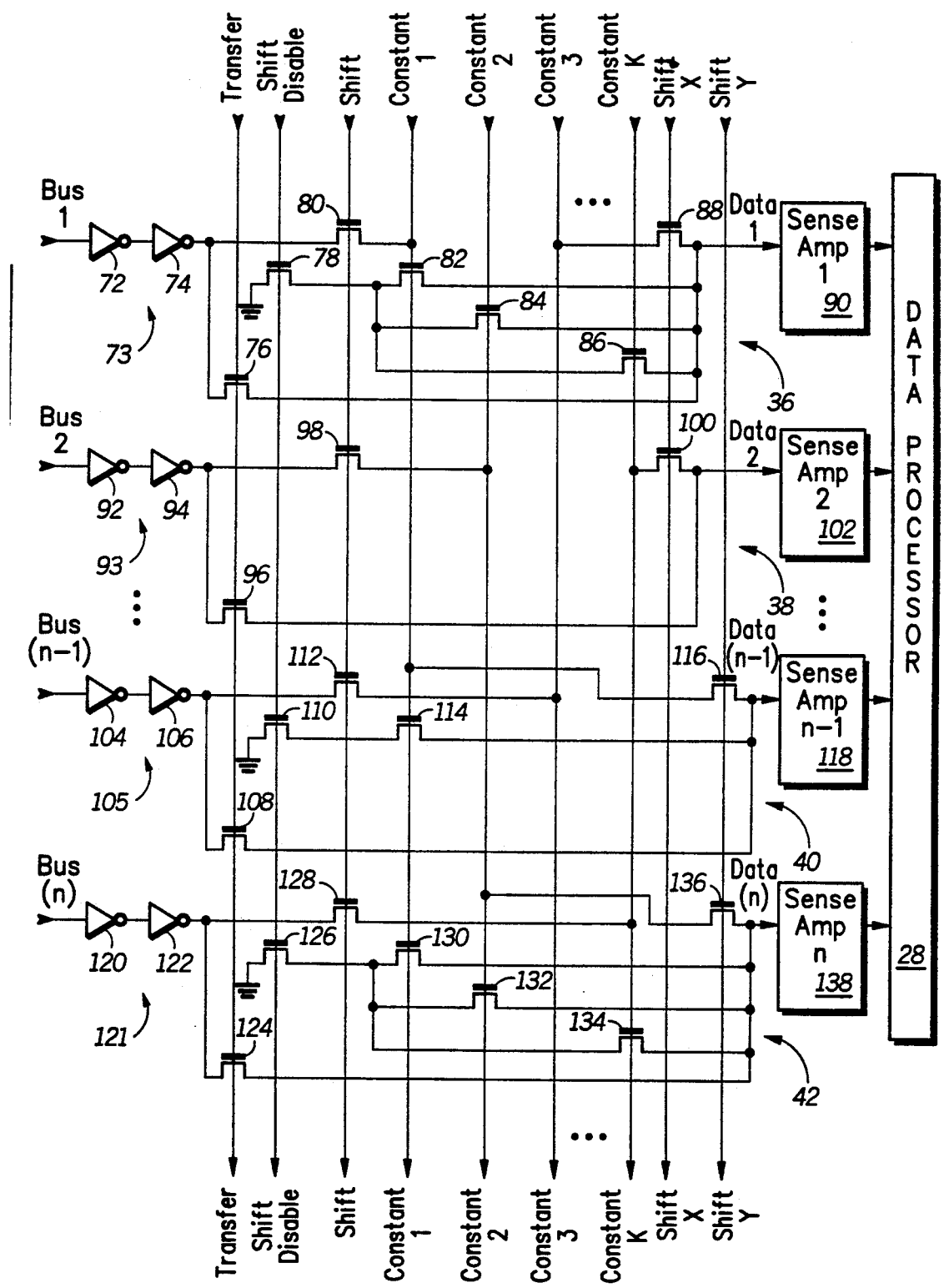
FIG. 3 illustrates in partial schematic form a Control Selector as illustrated in FIG. 1.

Each of the conductors illustrated in FIG. 3 which are respectively connected to the Constant 1-Constant K signals within control selector 30 is considered to be a functionally common conductor because each conductor is common to both a data shift function and a constant generation function as described below.

The Tri-State signal is provided by an output of inverter 71. An input of inverter 71 is the Shift signal. Therefore, if a shift operation occurs and the Shift signal is asserted, the Tri-State signal has a logic low value and the plurality of AND gates 58, 64, 65, and 68 is disabled. When the AND gates 58, 64, 65, and 68 are disabled, they do not provide output information to the Constant 1, Constant 2, and Constant K signals.

In operation, when the user of the data processing system 10 implements a software data processing instruction requiring a shift operation, the Shift signal is a logic high value. Since the input of the inverter 48 is a logic high value, the output of inverter 48 is a logic low. Regardless of the value of either the T1 or T3 signal, the output of AND gate 46 is a logic low value. Therefore, the Shift Disable signal is not asserted when the Shift signal is asserted.

If the Shift signal and either the T2 or the T4 signals are asserted, the output of NAND gate 52 has a logic low value. Because transistors 54, 56, 66, and 67 are implemented as p-type transistors in this example, a logic low value on the gate of each of the transistors 54, 56, 66, and 67 allows current to pass from one current electrode to the other current electrode. The first current electrode of each of the transistors is then pulled to the electrical power supply voltage. Therefore, each of the plurality of Constant signals, such as Constant 1, Constant 2, Constant 3 and Constant K signals, is pulled to the electrical power supply voltage and effectively precharged for subsequent operations.

When the Shift signal is asserted and neither the T2 signal nor the T4 signal is asserted, the output of NAND gate 52 has a logic high value. Each of transistors 54, 56, 66, and 67 is effectively disabled. Additionally, if the Shift signal is not asserted, the output of NAND gate 52 has a logic high value and each of transistors 54, 56, 66, and 67 is again disabled. When transistors 54, 56, and 66 are disabled, current is not allowed to pass from one current electrode to another current electrode.

The logic value of each of the Constant 1, Constant 2, Constant 3 and Constant K signals is determined in response to the value of the Shift signal and the value of the Tri-State signal. If the Shift signal is a logic high, the Tri-State signal has a logic low value, each of the AND gates 58, 64, 65, and 68 is disabled and the corresponding output signals, Constant 1, Constant 2, Constant 3 and Constant K, are not provided. If the Shift signal is a logic low value, and the Tri-State signal has a logic high value, each of disable AND gates 58, 64, 65, and 68 is not disabled. In this example, the output of each of AND gates 58, 64, 65, and 68 is dependent on the respective values of the C 1, C 2, C 3, and C K signals. Therefore, the logic value of the Constant 1, Constant 2, Constant 3 and Constant K signals reflects the respective logic values of the C 1, C 2, C 3, and C K signals.

Each of the signals output by the Control Selector Decode Logic circuit 34 of Decode Logic circuit 24 provides an input signal to the Control Selector 30. In general, control signals output by the Decode Logic circuit 24 provide a first plurality of input signals to enable the Execution Unit 26 to execute a predetermined software instruction. The Data Bus 13 provides a second plurality of input signals to the Execution Unit 26 to provide information which is manipulated by the Execution Unit 26 during execution of the software instruction.

The Execution Unit 26 is generally comprised of the Data Processor 28, the Control Selector 30 and the Storage and Processing Logic circuit 32. A first portion of the Execution Unit 26 is comprised of the Data Processor 28. The Data Processor 28 receives a first plurality of input signals from the Decode Logic circuit 24. The first plurality of input signals enables the Data Processor 28 to function in a predetermined manner specified by the user of the data processing system 10 through a predetermined software data processing instruction. For example, in one implementation, the Data Processor 28 is configured as an adder logic circuit (not shown) to add two or more numbers together.

A plurality of output signals of Data Processor 28 is provided to Data Bus 13. The Data Bus 13 transfers the plurality of output signals of the Data Processor 28 to the second input of Multiplexer 14. Multiplexer 14 subsequently provides the plurality of output signals to the second input/output terminal of the Input/Output Logic circuit 12 to be output to the user of the data processing system 10. Multiplexer 14 is controlled by a control signal (not shown) provided by the Data Processor 28.

A second portion of the Execution Unit 26 is comprised of the Storage and Processing Logic circuit 32. The Storage and Processing Logic circuit 32 receives a second plurality of input signals from the Decode Logic circuit 24. The second plurality of input signals enables the Storage and Processing Logic circuit 32 to function in a predetermined manner specified by the user of the data processing system 10. For example, during the execution of one form of software data processing instruction, the Storage and Processing Logic circuit 32 stores information in a plurality of register storage locations (not shown). During the execution of a second software data processing instruction, the Storage and Processing Logic circuit 32 may perform a variety of operations executed in a plurality of logic circuits (not shown).

A plurality of output signals is provided by the Storage and Processing Logic circuit 32 and is transferred to the second input/output terminal of the Multiplexer 14 via the Data Bus 13. The Multiplexer 14 then provides the plurality of output signals to the first input of the Input/Output Logic circuit 12. The Input/Output Logic circuit 12 subsequently provides the plurality of output signals to the user of the data processing system 10.

A third portion of the Execution Unit 26 is comprised of the Control Selector 30. The Control Selector 30 receives a third plurality of input signals from the Decode Logic circuit 24. The Control Selector 30 enables the data processing system 10 to:

(1) provide either an arithmetic shift operation of a plurality of input information signals; or
(2) to generate a constant value; or
(3) to latch and transfer information from the Data Bus 13 to the Data Processor 28 via the Control Selector 30 during operation of the data processing system 10.

In existing implementations of logic circuitry which provide similar functions, such as a processor labeled "MC68332", commercially available from Motorola Inc., dedicated data paths are implemented to execute the shift operation, to generate a constant value, and to transfer information. Significant circuit area of the MC68332 is used to implement each of the shift and constant generation functions. In data processing system 10, however, the Control Selector 30 multiplexes a plurality of conductors for both performing shift operations and generating constant values. The Control Selector 30 is illustrated in greater detail in FIG. 3.

The Control Selector 30 is generally comprised of a plurality of n data buffer circuits 73, 93, 105, and 121, a plurality of n Bit Stages 36, 38, 40, and 42, and a plurality of n Sense Amplifier circuits 90, 102, 118, and 138, where n is an integer.

Each one of the plurality of Bit Stages 36, 38, 40, and 42 represents a single bit of an information operand transferred to the Control Selector 30 by the Data Bus 13. In this implementation, the information operand is n bits wide. Bit Stages 36, 38, 40 and 42 correspond to bits one, two, (n−1) and (n) of the information value, respectively.

A Bit Stage 36 corresponds to bit one of the information received via the Data Bus 13. The Bit Stage 36 is comprised of a buffer circuit 73 and a plurality of n-channel transistors 76, 78, 80, 82, 84, 86, and 88.

A signal labelled "Bus 1" transfers the value of bit one of the information value to the Bit Stage 36. The Bus 1 signal provides an input to the buffer circuit 73. The buffer circuit 73 is comprised of an inverter 72 and an inverter 74. The buffer circuit 73 increases the magnitude of the Bus 1 signal for use in subsequent operations executed in Bit Stage 36. The Bus 1 signal provides an input to inverter 72. An output of inverter 72 is connected to an input of the second inverter 74. An output of the inverter 74 is connected to a first current electrode of both transistor 76 and transistor 80.

A gate of transistor 76 is connected to the Transfer signal. A second current electrode of transistor 76 is connected to a signal labelled "Data 1." The Data 1 signal transfers the output of Bit Stage 36 to Data Processor 28. When the Transfer signal is asserted, transistor 76 is enabled and the logic value of the buffered Bus 1 signal is transferred to the Data 1 signal. Therefore, the assertion of the Transfer signal results in the transfer of information from the Data Bus 13 to Data Processor 28 via the Control Selector 30. The information is buffered and is not modified in any other manner.

A first current electrode of transistor 80 is connected to an output of the inverter 74. A gate of transistor 80 is connected to the Shift signal, and a second current electrode of transistor 80 is connected to the Constant 1 signal. When the Shift signal is asserted, the gate of transistor 80 is enabled and information is subsequently transferred from the output of inverter 74 to the Constant 1 signal.

A first current electrode of transistor 88 is connected to the Constant 3 signal, and a gate of transistor 88 is connected to the Shift X signal. A second current electrode of transistor 88 is connected to the Data 1 signal.

A first current electrode of transistor 78 is connected to an electrical ground reference voltage. A gate of transistor 78 is connected to the Shift Disable signal, and a second current electrode of transistor 78 is connected to a first current electrode of each of transistors 82, 84, and 86. A second current electrode of each of transistors 82, 84, and 86 is connected to the Data 1 signal. A gate of transistor 82 is connected to the Constant 1 signal. Likewise, the gates of transistors 84 and 86 are respectively connected to the Constant 2 signal and the Constant K signal.

If the Shift Disable signal is asserted, the transistor 78 is enabled and the electrical ground reference voltage is provided to each of the first current electrodes of transistors 82, 84, and 86. When the Constant 1 signal is asserted to indicate that the first constant value is being generated, the transistor 82 is enabled and the value of the Data 1 signal is subsequently pulled to the electrical ground reference voltage. Likewise, if the Constant 2 signal and the Constant K signal are both asserted, transistors 84 and 86 are respectively enabled and the value of the Data 1 signal is consequently pulled to the electrical ground reference voltage in each case. By pulling the Data 1 signal low, bit one of an information value has a logic low value.

Bit Stage 38 corresponds to bit two of the information received via the Data Bus 13. The Bit Stage 38 is comprised of a buffer circuit 93 and a plurality of transistors 96, 98, and 100.

A signal labelled "Bus 2" transfers the value of bit two of the information value to the Bit Stage 38. The Bus 2 signal provides an input to the buffer circuit 93. The buffer circuit 93 is comprised of an inverter 92 and an inverter 94. Like the buffer circuit 73, buffer circuit 93 increases the magnitude of the Bus 2 signal for use in subsequent operations executed in Bit Stage 38. The Bus 2 signal provides an input to inverter 92. An output of inverter 92 is connected to an input of inverter 94. An output of inverter 94 is connected to a first current electrode of both transistor 96 and transistor 98.

A gate of transistor 96 is connected to the Transfer signal. A second current electrode of transistor 96 is connected to a signal labelled "Data 2." The Data 2 signal transfers the output of Bit Stage 38 to the Data Processor 28. When the Transfer signal is asserted, the gate of transistor 96 is enabled and the value of the buffered Bus 2 signal is transferred to the Data 2 signal. Therefore, the assertion of the Transfer signal results in the transfer of information from the Data Bus 13 to Data Processor 28 via the Control Selector 30. Again, the information is buffered and is not modified in any other manner.

A first current electrode of transistor 98 is connected to the output of inverter 94. A gate of transistor 98 is connected to the Shift signal and a second current electrode of transistor 98 is connected to the Constant 2 signal. When the Shift signal is a logic high, the control gate of transistor 98 is enabled and information is subsequently transferred from the output of inverter 94 to the Constant 2 signal.

A first current electrode of transistor 100 is connected to the Constant K, signal and a gate of transistor 100 is connected to the Shift X signal. A second current electrode of transistor 100 is connected to the Data 2 signal.

In this example, bit two of an information operand is not used to generate a constant value. For that reason, no transistors exist to pull the Data 2 signal low for any one of the plurality of constant values.

A signal labelled "Bus (n−1)" transfers the value of bit (n−1) of the information value to the Bit Stage 40. The Bus (n−1) signal provides an input to the buffer circuit 105. The buffer circuit 105 is comprised of an inverter 104 and an inverter 106. The buffer circuit 105 increases the magnitude of the Bus (n−1) signal for use in subsequent operations executed in Bit Stage 40. The Bus (n−1) signal provides an input to inverter 104. An output of inverter 104 is connected to an input of inverter 106. An output of inverter 106 is connected to a first current electrode of both transistor 108 and transistor 112.

A gate transistor 108 is connected to the Transfer signal. A second current electrode of transistor 108 is connected to a signal labelled "Data (n−1)." The Data (n−1) signal transfers the output of Bit Stage 40 to Data Processor 28. When the Transfer signal is asserted, the gate of transistor 108 is enabled and the value of the buffered Bus (n−1) signal is transferred to the Data (n−1) signal. Therefore, the assertion of the Transfer signal results in the transfer of information from the Data Bus 13 to Data Processor 28 via the Control Selector 30. The information is buffered and is not modified in any other manner.

A first current electrode of transistor 112 is connected to an output of inverter 106. A gate of transistor 112 is connected to the Shift signal, and a second current electrode of transistor 112 is connected to the Constant 3 signal. When the Shift signal is asserted, the gate of transistor 112 is enabled and information is subsequently transferred from the output of inverter 106 to the Constant 3 signal.

A first current electrode of transistor 116 is connected to the Constant 1 signal, and a gate of transistor 116 is connected to the Shift Y signal. A second current electrode of transistor 116 is connected to the Data $(n-1)$ signal.

A first current electrode of transistor 110 is connected to the electrical ground reference voltage. A gate of transistor 110 is connected to the Shift Disable signal, and a second current electrode of transistor 110 is connected to a first current electrode of transistor 114. A second current electrode of transistor 114 is connected to the Data $(n-1)$ signal. The gate of transistor 114 is connected to the Constant 1 signal.

If the Shift Disable signal is asserted, the gate of transistor 110 is enabled and the first current electrode of transistor 114 is pulled to the electrical ground reference voltage. When the Constant 1 signal is asserted to indicate that a first constant value is being generated, transistor 114 is enabled. The value of the Data $(n-1)$ signal is subsequently pulled to the electrical ground reference voltage. By pulling the Data $(n-1)$ signal low, bit $(n-1)$ of an information value has a logic low value.

A signal labelled "Bus (n)" transfers the value of the bit n of the information value to the Bit Stage 42. The Bus (n) signal provides an input to a buffer circuit 121. The buffer circuit 121 is comprised of an inverter 120 and an inverter 122. The buffer circuit 121 increases the magnitude of the Bus (n) signal for use in subsequent operations executed in Bit Stage 42. The Bus (n) signal provides an input to the first inverter 120. An output of the inverter 120 is connected to an input of the second inverter 122. An output of the inverter 122 is connected to a first current electrode of both transistor 124 and transistor 128.

A gate of transistor 124 is connected to the Transfer signal. A second current electrode of transistor 124 is connected to a signal labelled "Data (n)." The Data (n) signal transfers the output of Bit Stage 42 to the Data Processor 28. When the Transfer signal is asserted, a gate of transistor 124 is enabled and the value of the buffered Bus (n) signal is transferred to the Data (n) signal. Therefore, the assertion of the Transfer signal results in the transfer of information from the Data Bus 13 to Data Processor 28 via the Control Selector 30. Again, the information is buffered and is not modified in any other manner.

A first current electrode of transistor 128 is connected to the output of inverter 122, and a gate of transistor 128 is connected to the Shift signal. A second current electrode of transistor 128 is connected to the Constant K signal. When the Shift signal is asserted, the gate of transistor 128 is enabled and information is subsequently transferred from the output of inverter 122 to the Constant K signal.

A first current electrode of transistor 136 is connected to the Constant 2 signal, and a gate of transistor 136 is connected to the Shift Y signal. A second current electrode of transistor 136 is connected to the Data (n) signal.

A first current electrode of transistor 126 is connected to the electrical ground reference voltage. A gate of transistor 126 is connected to the Shift Disable signal, and a second current electrode of transistor 126 is connected to a first current electrode of each of transistors 130, 132, and 134. The second current electrode of each of transistors 130, 132, and 134 is connected to the Data (n) signal. A gate of transistor 130 is connected to the Constant 1 signal. Likewise, a gate of each of transistors 132 and 134 is respectively connected to the Constant 2 signal and the Constant K signal.

If the Shift Disable signal is a logic high value, the transistor 126 is enabled and the electrical ground reference voltage is connected to the first current electrode of each of transistors 130, 132, and 134. If the Constant 1 signal is asserted to indicate that a first constant value is needed, the transistor 130 is enabled which forces the logic value of the Data (n) signal to the electrical ground reference voltage. Likewise, if the Constant 2 signal and the Constant K signal are both asserted, transistors 132 and 134 are respectively enabled. The value of the Data (n) signal is consequently pulled to the electrical ground reference voltage in each case. By pulling the Data (n) signal low, bit n of an information value has a logic low value.

A shift operation is accomplished by using the conductors which control generation of the constant values to also transfer bits of data. For example, assume that the user of the data processing system 10 implements a software data processing instruction to shift an information operand to the right by n bits. During execution of the software data processing instruction, a portion of the information operand in the left-most bits is shifted to the right by n bits. In this example, the information operand is transferred by the Bus n signal, shifted to the right and output via the Data 2 signal. Likewise, the information operand transferred by the Bus $(n-1)$ signal is shifted to the right and output by the Data 1 signal.

In this implementation, both the Shift and Shift X signals have a logic high value during execution of a software data processing instruction to shift the information operation to the right by n bits. When the Shift signal is a logic high value, transistors 80, 98, 112, and 128 are all enabled. The information operand is transferred from the Data Bus 13 to a respective one of the plurality of constant information signals. The logic value of the Bus 1 signal is transferred to the Constant 1 signal line, and the value of the Bus 2 signal is transferred to the Constant 2 signal line when the Shift signal enables the gate of each of transistors 80 and 98. Additionally, the logic value of the Bus $(n-1)$ signal is transferred to the Constant 3 signal line, and the logic value of the Bus (n) signal is transferred to the Constant K signal line when the Shift signal enables transistors 112 and 128.

When the Shift X signal is asserted, the gate of transistor 88 of Bit Stage 36 and the gate of transistor 100 of Bit Stage 38 are both enabled. The logic value transferred via the Bus $(n-1)$ signal is then transmitted from the Constant 3 signal line to the second current electrode of the transistor 88. The logic value is output on the Data 1 signal and represents the logic value of bit one of a shifted information operand. The logic value transferred via the Bus (n) signal is transferred from the Constant K signal line to the second current electrode of the transistor 100. The information operand is output on the Data 2 signal and represents bit two of a shifted information value.

If the user of the data processing system 10 implements a software data processing instruction which implements a left shift operation, the Shift Y signal is asserted. In this example, the logic value transferred by the Bus 2 signal is shifted to the left and output via the Data (n) signal. Likewise, the logic value transferred by the Bus 1 signal is shifted to the left and output by the Data (n−1) signal.

In this implementation, both the Shift signal and the Shift Y signal are asserted during execution of a software data processing instruction to shift information to the left by n bits. During a left shift operation, the information operand is transferred to the inputs of the Control Selector circuit 30 by the same method used to execute a right shift operation. However, rather than the Shift X signal being a logic high value, the Shift Y signal is a logic high value.

When the Shift Y signal is a logic high value, the gate of transistor 116 of Bit Stage 40 and the gate of transistor 136 of Bit Stage 42 are both enabled. The logic value of the Bus 1 signal is then transferred from the Constant 1 signal line to the first current electrode of transistor 116. The logic value is output on the Data (n−1) signal as bit (n−1) of a shifted information operand. The logic value of the Bus 2 signal is then transferred from the Constant 2 signal line to the first current electrode of the transistor 136. The logic value is output on the Data (n) signal as bit n of a shifted information operand.

Before being used to transfer information during a shift operation, each one of the plurality of constant information signals is precharged to a logic high value. By precharging each one of the constant information signals, possible data contention during a shift operation is reduced. The Shift Disable signal disables the constant generation circuitry so that the plurality of precharged constant information signals does not generate a constant value.

The logic values output by each of the Bit Stages 36, 38, 40, and 42 provides a first input to a plurality of Sense Amplifier circuits, such as 90, 102, 118, and 138. The Sense Amplifier circuits 90, 102, 118, and 138 precharge the plurality of Data 1 through Data (n) lines to a reference voltage level. Each one of the plurality of Data 1 through Data (n) lines is respectively discharged when a logic low value should be output during a shift or constant generation operation. If a logic high value should be output during a shift or constant generation operation, the Data 1 through Data (n) lines remain at the precharged reference voltage level. The Sense Amplifier circuits 90, 102, 118, and 138, therefore, determine whether the output of the Bit Stages 36, 38, 40, and 42 is a logic high or low value.

In this example, the Data 1 signal provides an input to a Sense Amplifier circuit 90, and the Data 2 signal provides an input to a Sense Amplifier circuit 102. Likewise, the Data (n−1) signal provides an input to a Sense Amplifier circuit 118, and the Data n signal provides an input to a Sense Amplifier circuit 138. Each one of the plurality of Sense Amplifier circuits provides an output signal to the Data Processor 28.

As described herein, the data processing system 10 has a multiplexed conductor for both shifting information operands and controlling the generation of constants. The same conductor may be used for any form of shift operation. For example, the same conductor may be used for both right and left shifts. Additionally, the same conductor is used for a shift by four bits, a shift by eight bits and a shift by n bits. However, if the amount of bits transferred during a shift operation exceeds the number of constants needed during operation of a data processing system, conductors must be included to shift all of the necessary bits. Previous implementations of the shift and constant generation functions in a data processing system typically require separate conductors for each bit used in each form of a shift operation and for each constant value generated.

It should be well understood that the data processing system described herein provides an unique and efficient implementation of a method to execute both a shift function and a constant generation operation. Using the same conductors to accomplish two or more operations results in a data processor which may be implemented with less logic circuitry. In a semiconductor implementation of the data processing system described herein, less logic circuitry translates to a smaller device. In a technology in which smaller devices typically correspond to lower costs, smaller size becomes extremely important. As well, less logic circuitry in the Execution Unit 26 allows the designer of the data processing system 10 to include other logic circuits which enhance the performance of the system.

By now it should be apparent that there has been provided a data processor with a multiplexed conductor (each of the one or more conductors within control selector 30 connected to a Constant signal) for use in both shifting data and generating a constant value. The implementation of the invention described herein is provided by way of example only. Many other implementations may exist for executing the function described herein. For example, the Input/Output Logic circuit 12 and the Multiplexers 14 and 20 are implemented using a standard logic implementation. Additionally, the Multiplexers 14 and 20 could be removed from the data processing system 10. If Multiplexer 14 was removed, the Input/Output Logic circuit 12 could provide separate signals to respectively indicate either opcode or general information. As well, the Pipe 16 and the Opcode Decode Logic circuit are also implemented using standard logic circuitry. The Pipe 16 can be implemented as a conventional latch. The Storage Logic circuit 22 could be implemented as a ROM, a RAM, a PLA, or some other form of storage logic circuit. Additionally, the Data Processor 28 could be implemented to perform one or a variety of predetermined arithmetic functions. The Data Processor 28 might be implemented as an adder, a multiplier, or another logic circuit which performs an arithmetic function. The Storage and Processing Logic circuit 32 performs a wide variety of operations as determined by the designer of the data processing system. For example, the Storage and Processing Logic circuit 32 might act as a storage register or encompass a wide variety of logic circuits to manipulate data.

The Control Selector 30 and its peripheral components could also be implemented by a variety of circuitry. For example, the Control Selector Decode Logic circuit 34 could produce the Shift Disable, Shift, Constant 1, Constant 2, Constant K, Shift X, and Shift Y signals using any form of a random logic circuit. The Tri-State signal could also be implemented in any form of logic circuitry. As well, rather than disabling the AND gates 58, 64, 65, and 68 with the Tri-State signal, a circuit to selectively gate information values may be implemented. The buffer circuits 73, 93, 105, and 121 might also be implemented in another form. The transistors used to form the Control Selector 30 could be constructed using any semiconductor manufacturing process. The processes may include CMOS, MOS, HCMOS, NMOS, Bipolar, and GaAs semiconductor manufacturing techniques. As well, the plurality of Sense Amplifier circuits, such as 90, 102, 118, and 138 may be implemented using a standard logic circuit to sense the logic value of a portion of information.

The data processor described herein provides a versatile and efficient method to implement a conductor to execute both data shifting and constant generation operations in a data processing system. The data processor may be implemented in a variety of logic circuits as determined by a designer of a data processing system. The data processor will, however, increase the performance and efficiency of any system in which it is implemented.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system, comprising:
   storage means for receiving and storing a first data value;
   a decoder for decoding the first data value to provide a plurality of control signals; and
   control selection means for performing one of a shifting operation and a constant generation operation, the control section means, comprising:
   a first input for receiving the plurality of control signals;
   a second input for receiving a second data value;
   a plurality of bit stages, each of the plurality of bit stages being coupled to the first input for receiving at least one of the plurality of control signals and being coupled to the second input for receiving a bit of the second data value; and
   a common conductor for interconnecting the plurality of bit stages, the common conductor being used to transfer a bit of the second data value from a first one of the plurality of bit stages to a second one of the plurality of bit stages in response to a first one of the plurality of control signals, and the common conductor being used as a control signal for generating a constant data value in response to a second one of the plurality of control signals.

2. The data processing system of claim 1 wherein the first one of the plurality of control signals is asserted during the shifting operation and the second one of the plurality of control signals is asserted during the constant generation operation.

3. The data processing system of claim 1 wherein each of the plurality of bit stages comprises:
   an output for providing a predetermined bit of one of a shifted data value and the constant data value.

4. The data processing system of claim 3 wherein the data processing system further comprises:
   a data processor having a plurality of inputs, wherein each of the plurality of inputs is coupled to the output of a predetermined one of the plurality of bit stages for receiving the predetermined bit of one of the shifted data value and the constant data value.

5. The data processing system of claim 1 wherein a third one of the plurality of control signals is asserted to enable each of the plurality of bit stages to transfer a corresponding bit of the second data value to a data bus without performing the shifting operation and the constant generation operation.

6. The data processing system of claim 1 wherein the common conductor transfers the bit of the second data value from the first one of the plurality of bit stages to the second one of the plurality of bit stages to perform a right shift operation when both the first one of the plurality of control signals and a fourth one of the plurality of control signals are asserted.

7. The data processing system of claim 1 wherein the common conductor transfers the bit of the second data value from the first one of the plurality of bit stages to the second one of the plurality of bit stages to perform a left shift operation when both the first one of the plurality of control signals and a fifth one of the plurality of control signals are asserted.

8. The data processing system of claim 1 wherein each of the plurality of bit stages, comprises:
   a first transistor having a first electrode coupled to a reference voltage value, a gate electrode coupled to the decoder for receiving a third one of the plurality of control signals, and a second electrode, the third one of the plurality of control signal being asserted when the control selection means performs the constant generation operation;
   a second transistor having a first electrode coupled to the second electrode of the first transistor, a gate electrode coupled to the common conductor, and a second electrode coupled to an output of a predetermined one of the plurality of bit stages; and
   a third transistor having a first electrode coupled to the second input, a control electrode coupled to the decoder for receiving the second one of the plurality of control signals, and a second electrode coupled to the common conductor.

9. A method for performing one of a shifting operation and a constant generation operation in a data processing system, comprising the steps of:
   receiving and storing a first data value;
   decoding the first data value to provide a plurality of control signals;
   providing the plurality of control signals to each of a plurality of bit stages;
   providing a second data value to the plurality of bit stages, each of the plurality of bit stages receiving a corresponding bit of the second data value;
   enabling a first one of the plurality of bit stages to transfer a bit of the second data value to a second one of the plurality of bit stages via a common conductor when a first one of the plurality of control signals is asserted; and
   enabling a portion of the plurality of bit stages to generate a constant data value when a second one of the plurality of control signals is asserted, the common conductor being used to provide the second one of the plurality of control signals.

10. The method of claim 9 further comprising the steps of:
    providing the bit of the second data value at an output of the second one of the plurality of bit stages when the first one of the plurality of control signals is asserted; and providing the constant data value at an output of each of the portion of the plurality of bit stages when the second one of the plurality of control signals is asserted.

11. The method of claim 9 further comprising the step of:
enabling each of the plurality of bit stages to transfer the corresponding bit of the second data value to a data bus in response to a third one of the plurality of control signals.

* * * * *